(12) United States Patent
Woida-O'Brien

(10) Patent No.: US 8,890,072 B2
(45) Date of Patent: Nov. 18, 2014

(54) ADVANCE SPATIAL AND SPECTRAL TARGET GENERATION FOR HARDWARE IN THE LOOP SYSTEMS

(75) Inventor: Rigel Quinn Woida-O'Brien, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 419 days.

(21) Appl. No.: 13/314,915

(22) Filed: Dec. 8, 2011

(65) Prior Publication Data

US 2013/0148104 A1    Jun. 13, 2013

(51) Int. Cl.
*G01J 3/28* (2006.01)
*G01J 5/00* (2006.01)
*G01N 21/35* (2014.01)

(52) U.S. Cl.
USPC .................................................. 250/339.07

(58) Field of Classification Search
CPC ....... G01J 3/2823; G01J 5/0022; G01N 21/35
USPC .................................................. 250/339.07
See application file for complete search history.

(56) References Cited

U.S. PATENT DOCUMENTS

| | | | |
|---|---|---|---|
| 7,091,488 B2 * | 8/2006 | Maurel | 250/351 |
| 2002/0131698 A1 * | 9/2002 | Wilde | 385/31 |
| 2005/0185179 A1 * | 8/2005 | Wang | 356/328 |
| 2005/0270528 A1 * | 12/2005 | Geshwind et al. | 356/330 |
| 2010/0301218 A1 * | 12/2010 | Ayer | 250/341.1 |

* cited by examiner

*Primary Examiner* — Casey Bryant
(74) *Attorney, Agent, or Firm* — Schwegman Lundberg & Woessner, P.A.

(57) ABSTRACT

A system comprises a micro-mirror device including a surface having a plurality of micro-mirrors movable to reflect light incident to the micro-mirrors in at least a first direction and a second direction, a control circuit configured to arrange the micro-mirrors to project a spatial image using the incident light and to generate spectral content for the formed spatial image, and a spectrometer circuit configured to extract spectral image information from the generated spectral content and provide the spectral image information to the control circuit. The spectral content includes light having one or more wavelengths outside a range of wavelengths for visible light, and the control circuit is configured to rearrange one or more micro-mirrors of the micro-mirror device to adjust spectral content based on the extracted spectral image information.

23 Claims, 3 Drawing Sheets

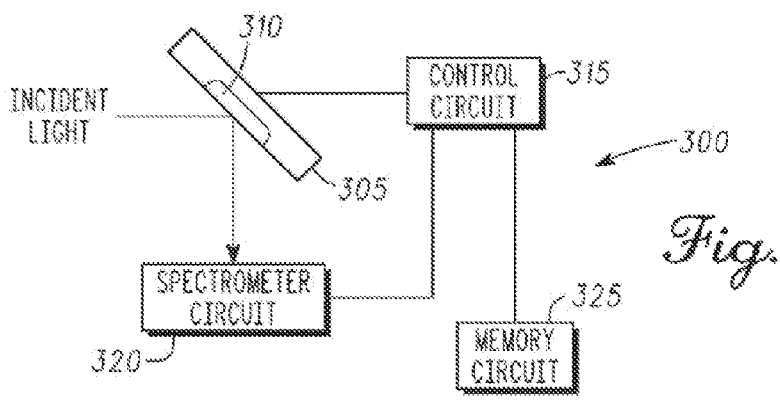
Fig. 3
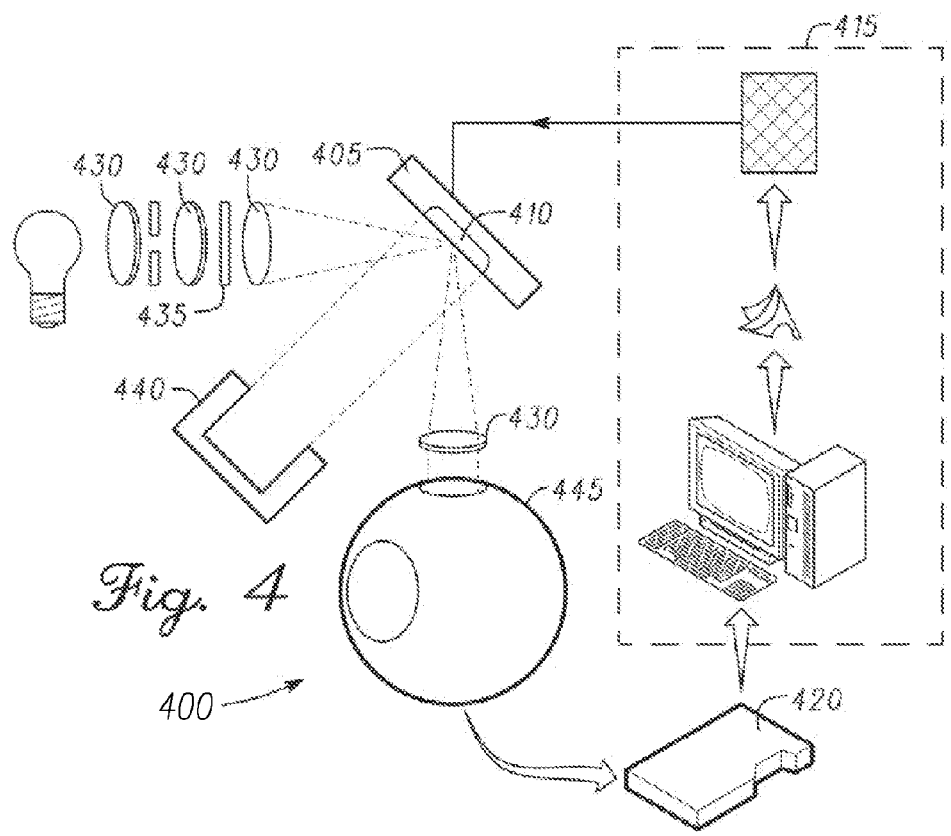
Fig. 4
Fig. 5
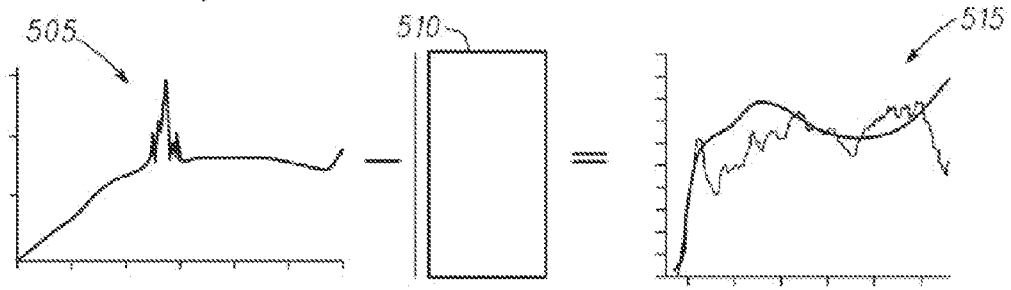

ADVANCE SPATIAL AND SPECTRAL TARGET GENERATION FOR HARDWARE IN THE LOOP SYSTEMS

BACKGROUND

Targeting systems and surveillance systems are designed to identify intended targets. Target identification is complicated by the fact that one or both of the targeting system and the target may be moving (e.g., airborne), and because a target typically changes in time and space. Consequently, actual targets have spatial features (e.g., shape) and spectral features (e.g., color) that change dynamically. Development of targeting and surveillance systems can be problematic due to the difficulty in simulating targets to test the system's ability to correctly identify targets. Current target simulators are typically not accurate in terms of spatial content and spectral content.

OVERVIEW

This document relates generally to targeting and surveillance systems and, in particular, to simulating target objects.

A method example includes receiving incident light onto a surface including movable micro-mirrors, and arranging one or more of the micro-mirrors to project a spatial image using the incident light and to generate spectral content for the formed spatial image. The spectral content includes light having one or more wavelengths outside a range of wavelengths for visible light. The method also includes extracting spectral image information from the spectral content, and further arranging one or more of the micro-mirrors using the extracted spectral image information to adjust the generated spectral content based on the extracted spectral image information.

A system example includes a micro-mirror device including a surface having a plurality of micro-mirrors movable to reflect light incident to the micro-mirrors in at least a first direction and a second direction, a control circuit configured to arrange the micro-mirrors to project a spatial image using the incident light and to generate spectral content for the formed spatial image, and a spectrometer circuit configured to extract spectral image information from the generated spectral content and provide the spectral image information to the control circuit. The spectral content includes light having one or more wavelengths outside a range of wavelengths for visible light, and the control circuit is configured to rearrange one or more micro-mirrors of the micro-mirror device to adjust spectral content based on the extracted spectral image information.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 is a block diagram of portions of an example of a system to generate a target model.

FIG. 4 is a block diagram of portions of another example of a system to generate a target model.

FIG. 5 shows an example of applying light to micro-mirrors to create a desired light profile.

DETAILED DESCRIPTION

This document discusses systems and methods for simulating targets to test the ability of a targeting system or portions of a targeting system to recognize targets. Target objects can be identified using spatial features of the object (e.g., the physical shape of the target) and using spectral features (e.g., as object color or a heat signature of the target). Typically, target simulators do not model both spatial features and spectral features of virtual targets accurately. Current simulators only provide a coarse approximation of a target. For instance, one way tong wave infrared (LWIR) is simulated is by presenting a pinhole target object against blackbody radiation. This may coarsely simulate a target at a distance, but omits spatial and spectral information about a target that may be critical. Another method is to use a resistive array to simulate a target in a scene. However, the spatial and spectral information provided by the resistive array is only a coarse approximation. The resolution of the scene is poor and is difficult to control in approximating a moving target in a scene.

It is desirable to generate target models having finer detail with regard to spatial content and spectral content than a target seeker system can resolve. This would allow more accurate assessment of the target seeker system's ability to recognize a target. Spatial content can include information related to shape and size of the target. Spectral content can include image data at specific frequencies or a range of frequencies across the electromagnetic spectrum. Spectral content can include frequencies in the visible range of tight (e.g., blue, green, and red wavelengths), the ultraviolet range of light, and the infrared rang of light (e.g., near infrared, mid-infrared, and thermal infrared).

Figure 1:
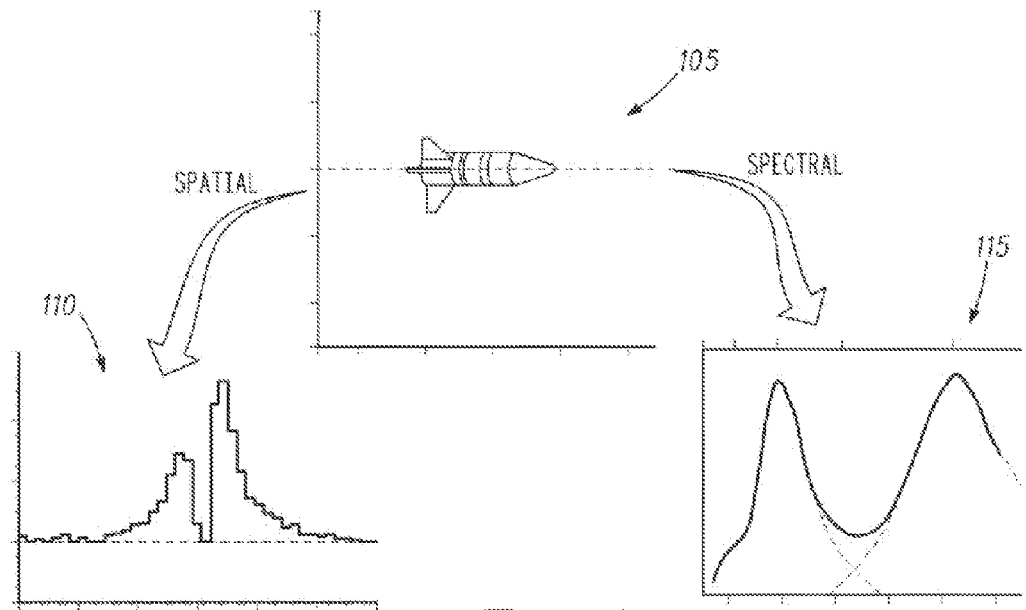
FIG. 1 illustrates a representation of a fully programmable target that has both spatial and spectral features that are accurate and tunable.

FIG. 1 illustrates a representation of a fully programmable target that has both spatial and spectral features that are accurate and tunable. The center illustration represents a target scene 105. The graph 110 to the left of the target scene 105 is a representation of spatial information obtained from the target scene 105 at the profile line. The graph 115 to the right of the target scene 105 represents spectral information obtained from the target scene 105 at the profile line. The target scene 105 is dynamically reconfigurable to change the spatial and spectral content.

A digital micro-mirror device (DMD) includes an array of small mirrors (micro-mirrors). The arrays of micro-mirrors can be of different shapes and sizes, such as square arrays (e.g., 400×400 mirrors, 1000×1000 mirrors, etc.) or rectangle arrays (e.g., 800×600, 1024×768 mirrors, 1400×1050 mirrors, etc.). A single micro-mirror may be 13 micrometers (μm) across. The mirrors can be individually moved (e.g., rotated ±10 to 12 degrees) to an on state and an off state. The DMD can be fabricated on a single integrated circuit (IC) and an individual micro-mirror can be referred to as a pixel. A DMD can include an array of static random access memory (SRAM) with an SRAM cell allocated for each pixel. The mirrors are held in place with a bias voltage. To move the mirrors, the SRAM cell array is loaded with position information. The bias voltage is removed allowing the contents of an SRAM cell to move its corresponding micro-mirror. The bias voltage is then reapplied to hold the micro-mirror. A device having micro-mirrors such as a DMD can be used to generate a programmable target model.

Figure 2:
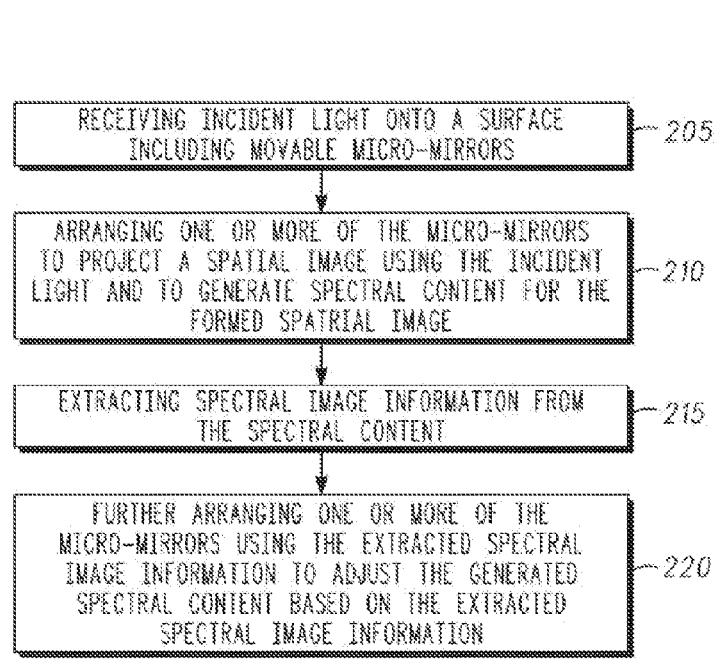
FIG. 2 shows an example of a flow diagram of a method of generating a target model.

FIG. 2 shows an example of a flow diagram of a method 200 of generating a target model. At block 205, incident light is received onto a surface including movable micro-mirrors. The surface can be included in a DMD.

At block 210, one or more of the micro-mirrors are arranged to project a spatial image using the incident light and to generate spectral content for the formed spatial image. The spectral content generated includes light having one or more wavelengths outside a range of wavelengths for visible light, such as wavelengths in one or both of the ultraviolet spectrum and the infrared spectrum.

At block 215, spectral image information is extracted from the spectral content. The spectral image information can be analyzed to determine if the spectral image matches a desired spectral image for the target model. At block 220, one or more of the micro-mirrors are further arranged using the extracted spectral image information to adjust the generated spectral content based on the extracted spectral image information. In this way, feedback can be incorporated into the process of generating a target model to arrive at a desired target model.

FIG. 3 is a block diagram of portions of an example of a system 300 to generate a target model. The system 300 includes a micro-mirror device 305 that includes a surface 310 of adjustable micro-mirrors to reflect light incident to the micro-mirrors. In some examples, the micro-mirror device 305 is a DMD. In certain examples, the micro-mirror device 305 is a single DMD integrated circuit (IC) chip. In certain examples, the micro-mirror device 305 is a digital light processor (DLP), A DLP is a type of DUD that can be used in DLP projectors to create color images. The DLP can be a single DLP chip IC.

The system 300 also includes a control circuit 315 electrically coupled to the micro-mirror device 305. The control circuit 315 can include a processor such as a microprocessor, a digital signal processor, application specific integrated circuit (ASIC), or other type of processor, interpreting or executing instructions in software modules or firmware modules. The control circuit 620 includes other circuits or sub-circuits to perform the functions described. These circuits may include software, hardware, firmware or any combination thereof. Multiple functions can be performed in one or more of the circuits or sub-circuits as desired.

The control circuit 315 arranges the micro-mirrors to project a spatial image using the incident light and to generate spectral content for the formed spatial image. In some examples, the micro-mirror device includes a memory array circuit. The control circuit 315 can set the position of the micro-mirrors by writing the contents of the memory array. The spectral content generated includes light having one or more wavelengths outside a range of wavelengths for visible light. This allows the system 300 to generate a target model that includes spectral image information in one or more of the ultraviolet spectrum band in the infrared spectrum band, including thermal infrared. Thus, the generated target model includes more spectral information than just the visible spectrum and produces a target model that includes more than just color information and spatial information.

To provide feedback in the system 300, a spectrometer circuit 320 is included to extract spectral image information from the generated spectral content and provide the spectral image information to the control circuit 315. In certain examples, the spectrometer circuit 320 measures the intensity of light in one or more different specified wavelength bands (including spectral band s of non-visible light) and provides an indication of the intensity or intensities to the control circuit 315.

In some examples, the spectrometer circuit 320 extracts spectral image information in one or more of the near-infrared (NIR) region of light, the short wavelength infrared (SWIR) region of light, and the mid-wavelength infrared region of light (MWIR). In certain examples, the spectrometer circuit 320 extracts spectral image information in the long-wavelength infrared region (LWIR) of light. This is sometimes referred to as the thermal imaging region. The spectrometer circuit 320 provides one or more of the NIR, SWIR, MWIR, and the LWIR spectral image information to the control circuit.

Based on the extracted spectral image information, the control circuit 315 rearranges one or more micro-mirrors of the micro-mirror device to adjust the spectral content. This feedback enables the control circuit 315 to adjust the target model towards a desired target model. In some examples, the system 300 includes a memory circuit 325 integral to, or coupled to, the control circuit 315 and configured to store target spectral image information. The control circuit 315 adjusts the one or more micro-mirrors to adjust the extracted spectral image information towards the stored target spectral image information.

FIG. 4 is a block diagram of portions of another example of a system 400 to generate a target model. As in the example of FIG. 3, the system 400 includes a micro-mirror device 405 that includes a surface 410 having adjustable micro-mirrors to reflect light incident to the micro-mirrors, such as a DMD or a DLP. The micro-mirror device 405 can include a memory array to control the positioning of the micro-mirrors. The system 400 also includes a spectrometer circuit 420 and a control circuit 415 electrically coupled to the micro-mirror device 405 and the spectrometer circuit 420.

The control circuit 415 can include a processor to execute instructions to perform image processing on image information including spectral image information provided by the spectrometer circuit 420. The image processing by the control circuit 415 generates a pattern to position the micro-mirrors, such as a bit pattern that is written to the memory array of the micro-mirror device 405. The pattern is used to create a target image. In some examples, the control circuit 415 recurrently updates the position of one or more of the micro-mirrors to change the formed spatial image and spectral content in real time. This allows the target image to be updated to form a target model that changes in real time. In some examples, the pattern of the micro-mirror device can be updated at a rate of 8000 Hertz (Hz).

In the system 400, light from a light source (e.g. a white lamp) is focused by a lens 430 or lenses to a slit and then applied to an optical grating 435. The optical grating 435 spreads the incident tight into bands of specified wavelengths. In certain examples, a collimator is used to direct the light from the lamp. The light bands are then applied to the mirror-mirror device 405. In certain examples, the light bands are focused onto the micro-mirrors using a tens. A light band can be applied to one or more columns (or alternatively rows) of the micro-mirrors. The control circuit 415 activates specified mirrors (e.g., specified columns) of the micro-mirror device to filter the light into the separate light frequencies. This creates a light profile of light intensity versus wavelength.

In some examples, the micro-mirrors may be biased in one of two positions (e.g., +12° and −12°, or ±12° and 0°). Light of unwanted wavelengths is applied to micro-mirrors in the first position and reflected to a beam dump device 440, where photons from light of unwanted wavelengths are simply trapped. Light that is applied to micro-mirrors in the second position are used to create the desired light profile. An example is shown in FIG. 5. Light from a xenon lamp having a spectral profile as shown in the graph 505 on the left is spread using an optical grid and applied to a mask 510 implemented by the micro-mirror device 405 of FIG. 4. The graph 515 on the right represents the desired spectral light profile.

In some examples, the system 400 of FIG. 4 includes a device to mix the light reflected from micro-mirrors in the second position. An example is an integrating sphere 445. The integrating sphere 445 receives tight of separate light frequencies reflected front the micro-mirrors that are not reflected to the beam dump 440, and mixes the received separate light frequencies reflected from the micro-mirror device 405 into a homogenous spectral profile. The result is a spectrally tuned irradiance that is tunable in intensity and wavelength and provided as a target model output. The system 400 of FIG. 4 cart be referred to as a spectrally tunable (STI) system.

Figure 6:
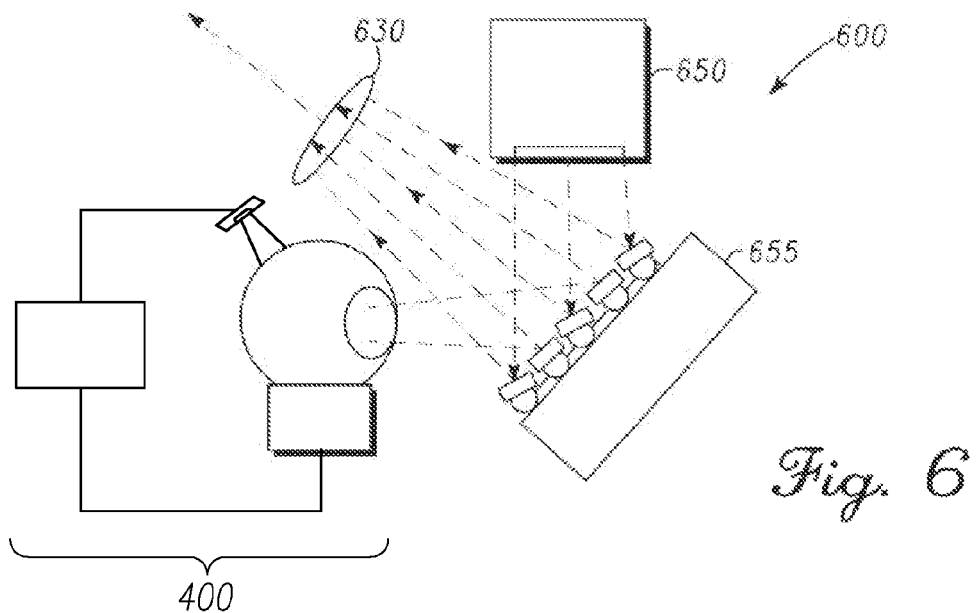
FIG. 6 is a block diagram of an example of a system to generate a tunable target model with a tunable background.

FIG. 6 is a block diagram of an example of a system 600 to combine the target model with a tunable background. The system 600 includes an STI system 400 to provide a spectrally tunable target model and includes a background source 650 that emits at least one of thermal energy and electromagnetic energy in an ultraviolet to infrared energy spectrum. The system 600 further includes a second micro-mirror device 655 that receives the projected spatial image and spectral content produced using the first micro-mirror device (e.g., the micro-mirror device 305 of FIG. 3 or the micro-mirror device 405 of FIG. 4) and the at least one of the thermal energy and electromagnetic energy from the background source 650. The second micro-mirror device 655 projects a second image representative of a target against an ambient background.

The second micro-mirror device can be coupled to the same control circuit 315, 415 or a different control circuit as the first micro-mirror device 305, 405 of FIG. 3 or 4. The control circuit controls one or more micro-mirrors of the second micro-mirror device 655 to independently adjust, in the second projected image, spectral content associated with the background source 650 and the spectral content associated with the projected spatial image from the first micro-mirror device. The system 600 can include a lens 630 to provide focused projected image to a "seeker" or a targeting device under test.

The system 600 allows fully dynamic scenes to be created using wavelengths of non-visible light. For instance, the second micro-mirror device 655 can combine thermal information from the background source with the target model information generated by the STI system 400 to generate a target scene with a warm target (e.g., a missile) in front of a cold or cool background. The system can generate target scenes having a number of targets and can reconfigure the size, shape, and spectral information of the targets and background. Target scenes may be reconfigured at a rate limited by the DMD reconfiguration rate (e.g., up to 8000 Hz).

Figure 7:
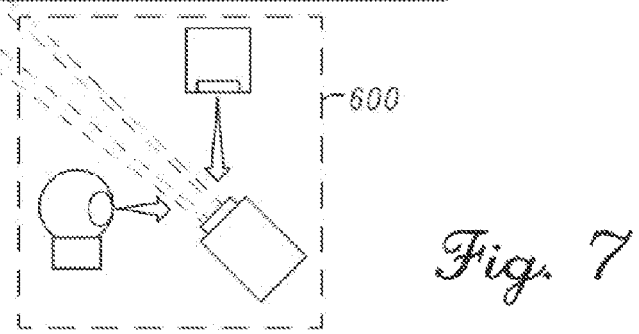
FIG. 7 shows an example of portions of a system that projects a target scene to a targeting device.

FIG. 7 shows an example of portions of a system 700 that projects an image 705 of a combined tunable target model and a tunable target background to a targeting device under test 710. The image 705 can include a warm target 720 that includes spectral information against a cold background 725. In certain examples, the system 700 includes one or more of a lens or mirror 715 to focus the generated image or scene onto the device under test 710.

The systems described herein allow for more accurate testing and simulation of targeting devices, such as targeting devices used in interceptor systems. Alternatively, the systems can be used to generate target scenes to defeat targeting devices. The systems may be used for any application that uses radiometric or spectral calibration, such as a satellite-deployed tracking system for example.

Additional Notes

The above detailed description includes references to the accompanying drawings, which form a part of the detailed description. The drawings show, by way of illustration, specific embodiments in which the invention can be practiced. These embodiments are also referred to herein as "examples," All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc, are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile computer-readable media during execution or at other times. These computer-readable media can include, but are not limited to, hard disks, removable magnetic disks, removable optical disks (e.g., compact disks and digital video disks), magnetic cassettes, memory cards or sticks, random access memories (RAM's), read only memories (ROM's), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A system comprising:
a first micro-mirror device including a surface having a plurality of micro-mirrors movable to reflect light incident to the micro-mirrors in at least a first direction and a second direction;
a control circuit configured to arrange the micro-mirrors to project a spatial image using the incident light and to generate spectral content for the spatial image to form a simulated target model containing both spatial information and spectral information, the spectral content including light having one or more wavelengths outside a range of wavelengths for visible light; and
a spectrometer circuit configured to extract spectral image information from the generated spectral content and provide the spectral image information to the control circuit,
wherein the control circuit is configured to, based on the extracted spectral image information, rearrange one or more micro-mirrors of the micro-mirror device to tune spectral content of the target model closer to specified target spectral image information.

2. The system of claim 1, including:
a memory circuit integral to, or coupled to, the control circuit and configured to store target spectral image information, and
wherein the control circuit is configured to adjust the one or more micro-mirrors to adjust the extracted spectral image information towards the stored target spectral image information.

3. The system of claim 2, wherein the control circuit is configured to recurrently update the position of one or more of the micro-mirrors to change the formed spatial image and spectral content in real time.

4. The system of claim 1, including:
a background source configured to emit at least one of thermal energy and electromagnetic energy in an ultraviolet to infrared energy spectrum; and
a second micro-mirror device configured to:
receive the projected spatial image and spectral content produced using the first micro-mirror device and the at least one of the thermal energy and electromagnetic energy from the background source; and
project a second image representative of a target against an ambient background.

5. The system of claim 4, including a targeting device under test to receive a projection of the second image.

6. The system of claim 4,
wherein the second micro-mirror device is electrically coupled to the same or a different control circuit as the first micro-mirror device, and
wherein the control circuit is configured to control one or more micro-mirrors of the second micro-mirror device to independently adjust, in the second projected image, spectral content associated with the background source and the spectral content associated with the projected spatial image from the first micro-mirror device.

7. The system of claim 1, wherein the first micro-mirror device includes a single digital micro-mirror device (DMD) integrated circuit chip.

8. The system of claim 1, wherein the spectrometer is configured to extract spectral image information in the long-wavelength infrared region (LWIR) of light and provide the LWIR spectral image information to the control circuit.

9. The system of claim 1, including an integrating sphere configured to:
receive light of separate light frequencies reflected from the micro-mirrors; and
mix the received separate light frequencies reflected from the micro-mirror device into a homogenous spectral profile.

10. The system of claim 1, including:
an optical grating to spread the incident light onto the micro-mirror device, and
wherein the control circuit is configured to activate specified mirrors of the micro-mirror device to filter the light into the separate light frequencies.

11. A method comprising:
receiving incident light onto a surface including movable micro-mirrors;
arranging one or more of the micro-mirrors to project a spatial image using the incident light and to generate spectral content for the spatial image to form a simulated target model containing both spatial information and spectral information, wherein the spectral content includes light having one or more wavelengths outside a range of wavelengths for visible light;
extracting spectral image information from the spectral content; and
further arranging one or more of the micro-mirrors using the extracted spectral image information to adjust the generated spectral content of the target model closer to specified target spectral image.

12. The method of claim 11, wherein arranging one or more micro-mirrors includes arranging one or more micro-mirrors to adjust the spectral image information towards target spectral image information.

13. The method of claim 12, including recurrently arranging one or more of the micro-mirrors to change the formed spatial image and spectral content in real time.

14. The method of claim 11, including:
projecting the formed spatial image and generated spectral content onto a second micro-mirror device;
projecting a background image onto the second micro-mirror device to form a second image that simulates a target against an ambient background; and
projecting the second formed image to a target detecting device.

15. The method of claim 14, including at least one of:
adjusting one or more micro-mirrors of the second micro-mirror device to change the generated spectral content of the first formed image independently from spectral content of the background image; and
adjusting one or more micro-mirrors of the second micro-mirror device to change spectral content of the background image independently of spectral content of the first formed image.

16. The method of claim 11, wherein receiving incident light onto a micro-mirror device includes receiving the incident light onto a single digital micro-mirror device (DMD) integrated circuit chip.

17. The method of claim 11,
wherein extracting spectral image information includes obtaining the spectral image information using a spectrometer and providing the spectral image information to a processor, and
wherein arranging one or more micro-mirrors of the micro-mirror device to adjust spectral content includes the processor adjusting the one or more micro-mirrors toward a desired spectral content profile stored in memory coupled to, or integral to, the processor.

18. The method of claim 11,
wherein receiving incident light onto adjustable micro-mirrors includes receiving light separated into separate electromagnetic spectrum bands onto the micro-mirrors, and
wherein arranging the micro-mirror device to form a spatial image includes mixing light of the separate spectrums bands reflected from the micro-mirror device to form the spatial image and generate the spectral content.

19. The method of claim 11, wherein receiving incident light onto a micro-mirror device includes:
spreading the incident light over the micro-mirrors of the micro-mirror device;
filtering the spread light into separate frequencies using the micro-mirror device; and
recombining the filtered light into a homogenous spectral profile.

20. A system comprising:
a first device including:
a first digital micro-mirror device (DMD) including a surface having a plurality of micro-mirrors movable to reflect light incident to the micro-mirrors in at least a first direction and a second direction;
a control circuit configured to arrange the micro-mirrors to project a spatial target image using the incident light and to generate spectral content for the spatial target image to form a simulated target model containing both spatial information and spectral information, the spectral content including light having one or more wavelengths outside a range of wavelengths for visible light; and
a spectrometer circuit configured to extract spectral image information in the long-wavelength infrared region (LWIR) of light and provide the LWIR spectral image information to the control circuit, wherein the control circuit is configured to further arrange one or more micro-mirrors of the micro-mirror device to adjust spectral content of the target model closer to specified target spectral image information based on the extracted spectral image information; and
a targeting device to receive a projection of the spatial target image and the generated spectral content.

21. The system of claim 20, wherein the first device includes:
a second DMD configured to:
receive the projected spatial image, the generated spectral content, and at least one of thermal energy and electromagnetic energy in an infrared energy spectrum representing a background of the spatial target image; and
provide a projection of the spatial image and the background for the image to the targeting device.

22. The system of claim 21, including:
a background source configured to emit the at least one of thermal energy and electromagnetic energy,
wherein control circuit is configured to independently adjust spectral content of the spatial image and spectral content of the background.

23. The system of claim 20, wherein the first DMD includes a single DMD integrated circuit chip.

\* \* \* \* \*

UNITED STATES PATENT AND TRADEMARK OFFICE
CERTIFICATE OF CORRECTION

| | | |
|---|---|---|
| PATENT NO. | : 8,890,072 B2 | Page 1 of 1 |
| APPLICATION NO. | : 13/314915 | |
| DATED | : November 18, 2014 | |
| INVENTOR(S) | : Rigel Quinn Woida-O'Brien | |

It is certified that error appears in the above-identified patent and that said Letters Patent is hereby corrected as shown below:

In the specification

In column 2, line 28, delete "tong" and insert --long--, therefor

In column 2, line 45, delete "tight" and insert --light--, therefor

In column 2, line 47, delete "rang" and insert --range--, therefor

In column 3, line 39, delete "(DLP)," and insert --(DLP).--, therefor

In column 3, line 39, delete "DUD" and insert --DMD--, therefor

In column 4, line 60, delete "tight" and insert --light--, therefor

In column 4, line 64, delete "tens." and insert --lens.--, therefor

In column 5, line 18, delete "tight" and insert --light--, therefor

In column 5, line 19, delete "front" and insert --from--, therefor

In column 5, line 25, delete "cart" and insert --can--, therefor

In column 5, line 25, after "tunable", insert --illumination--, therefor

In column 6, line 18, delete "example," and insert --example.--, therefor

In column 6, line 41, delete "etc," and insert --etc.--, therefor

Signed and Sealed this
Thirty-first Day of May, 2016

Michelle K. Lee
*Director of the United States Patent and Trademark Office*